Figure 1:
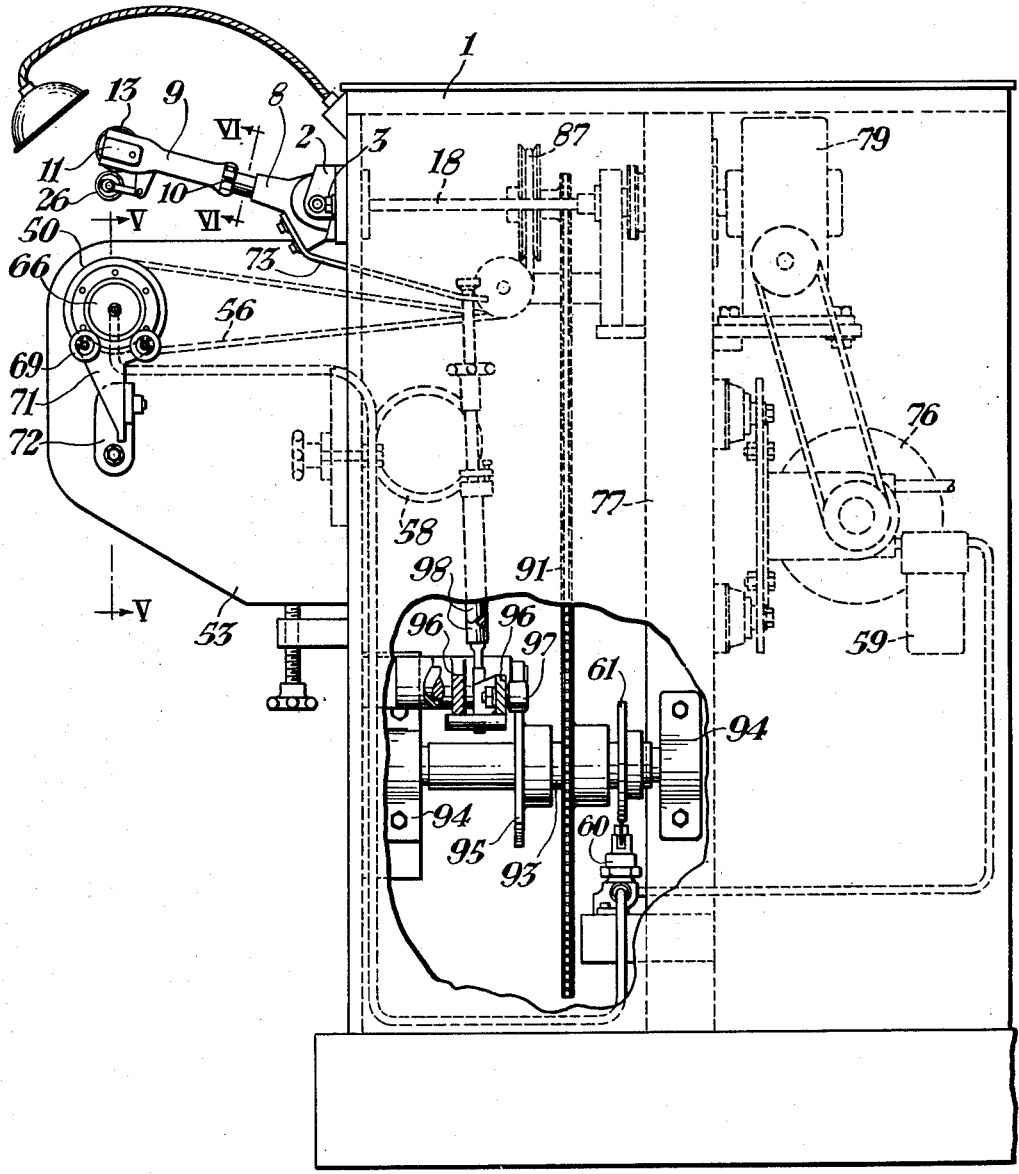

INVENTOR.
George E. Ryckman.
BY
Brown, Critchlow, Flick & Peckham
HIS ATTORNEYS

INVENTOR.
George E. Ryckman.
HIS ATTORNEY

Aug. 4, 1953

G. E. RYCKMAN 2,647,489

MACHINE FOR APPLYING PRECIOUS METAL
DECORATIVE BANDS TO GLASS TUMBLERS

Filed Sept. 19, 1951

5 Sheets-Sheet 5

INVENTOR.
George E. Ryckman.
BY
Brown, Critchlow, Flick & Peckham
HIS ATTORNEYS

Patented Aug. 4, 1953

2,647,489

UNITED STATES PATENT OFFICE 2,647,489

MACHINE FOR APPLYING PRECIOUS METAL DECORATIVE BANDS TO GLASS TUMBLERS

George E. Ryckman, Edgewood, Pa., assignor to Miller Pottery Engineering Company, Swissvale, Pa., a corporation of Pennsylvania Application September 19, 1951, Serial No. 247,241

10 Claims. (Cl. 118—219)

This invention relates to apparatus for applying to glass and ceramic articles continuous or interrupted bands of precious metal solution which, when properly heated, produce metal films that firmly adhere to the ware and reflect light like a mirror.

Many attempts have been made to apply bands of precious metal, such as gold, silver, platinum and palladium, to glass tumblers and the like by mechanical means, but today manual decoration of this character is still the standard practice throughout the industry. This shows that machine developments have been unsatisfactory. A reason for their failure is that an attempt has been made to use the machines that have been employed for applying ceramic colors. Although there is no particular difficulty in mechanically applying bands of ceramic colors to tumblers, the application of precious metal solutions to them has presented many problems which the old machines have not been able to overcome. Such machines generally apply colors by means of rotating metal discs which dip into reservoirs of low viscosity mediums. In applying color, it is not necessary to control the thickness of application by any means other than the surface tension forces which act upon the medium as it adheres to the rotating discs. In fact, metal discs have required the medium to be put on thick, i. e., a few thousandths of an inch, in order to compensate for geometric variations in the contact conditions between the discs and the work. Without control of band thickness, the application of precious metal becomes prohibitive in cost, and results in a totally unacceptable product where the band thickness exceeds about 12 millionths of an inch, due to eruption of carbonaceous material in the vehicle through the surface of the band at critical firing temperatures. Precious metal films after firing should not be more than four or five millionths of an inch thick, but conventional color applying machines are not capable of applying such thin bands of precious metal in a way to make a satisfactory product. If a low viscosity precious metal solution is used, it has such low film strength that the disc pressure against the work tends to squeeze it outwardly, thus forming two thick beads on the edges of the applied band. When sufficient solution is applied to the rotating discs to permit them to wet the ware, the resulting bands are always much too thick to fire out clean and are always prohibitively expensive in precious metal consumption.

It is among the objects of this invention to provide apparatus for applying precious metal bands and the like to rotating glass and ceramic articles by means of a roller that moves toward and away from the axis of rotation of the work, which apparatus applies bands of uniform thickness, which controls the thickness of the bands, which applies a plurality of bands simultaneously, which applies a wide band simultaneously to different areas of an article disposed at an angle to each other, and in which the relationship between the axis of the rotating article and the angle of approach of the applicator roller is adjustable.

Figure 2:
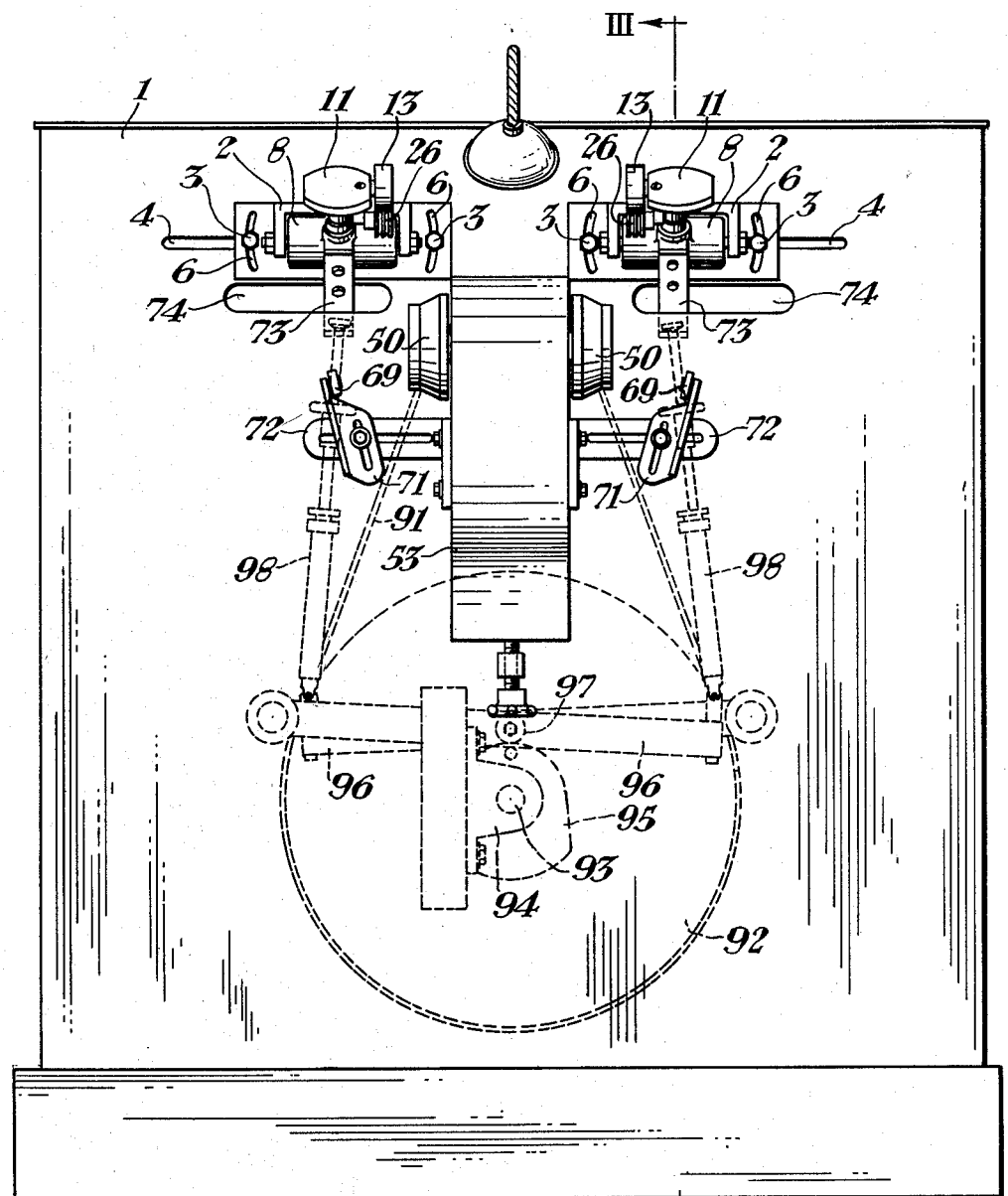
Figure 3:
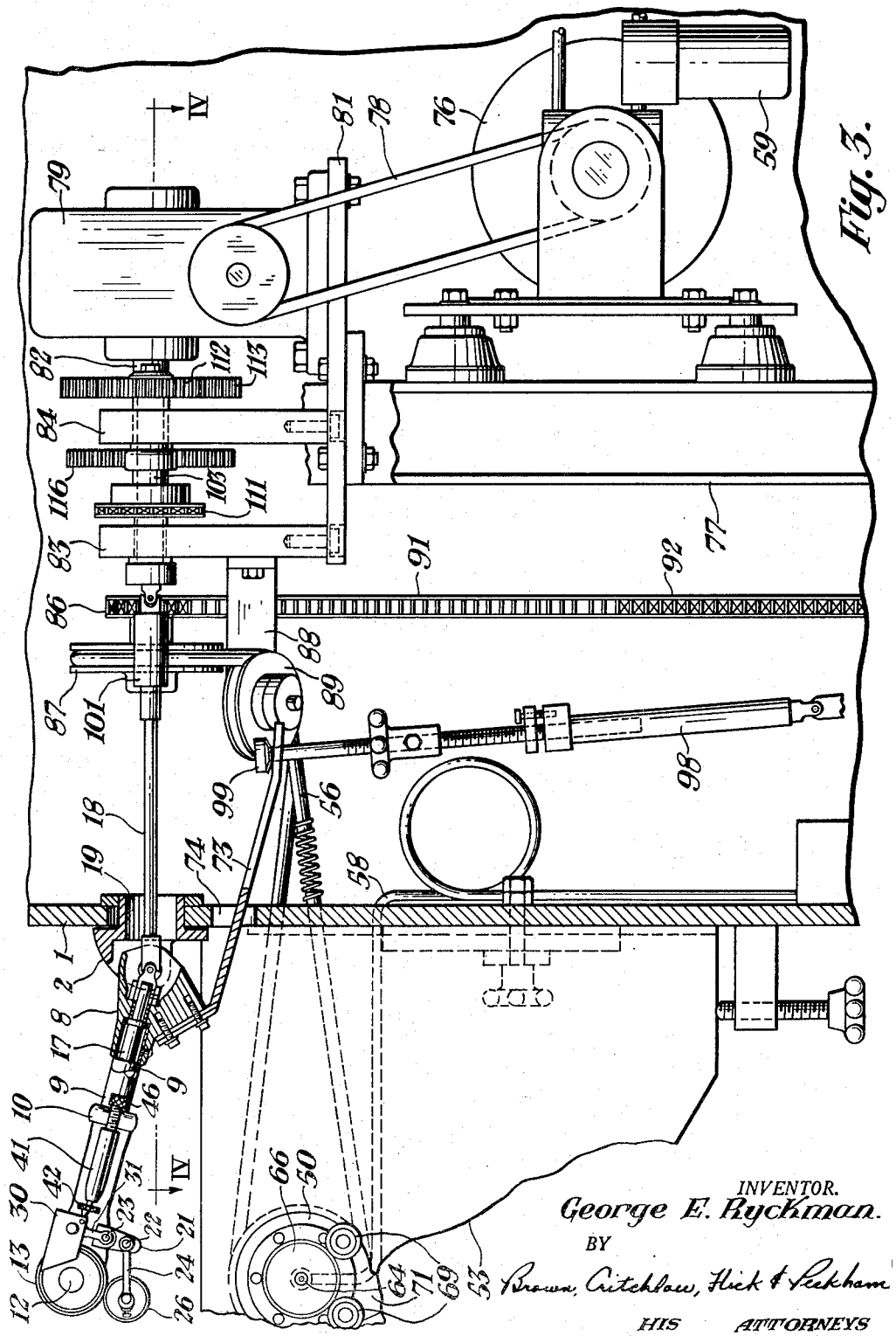
Figure 4:
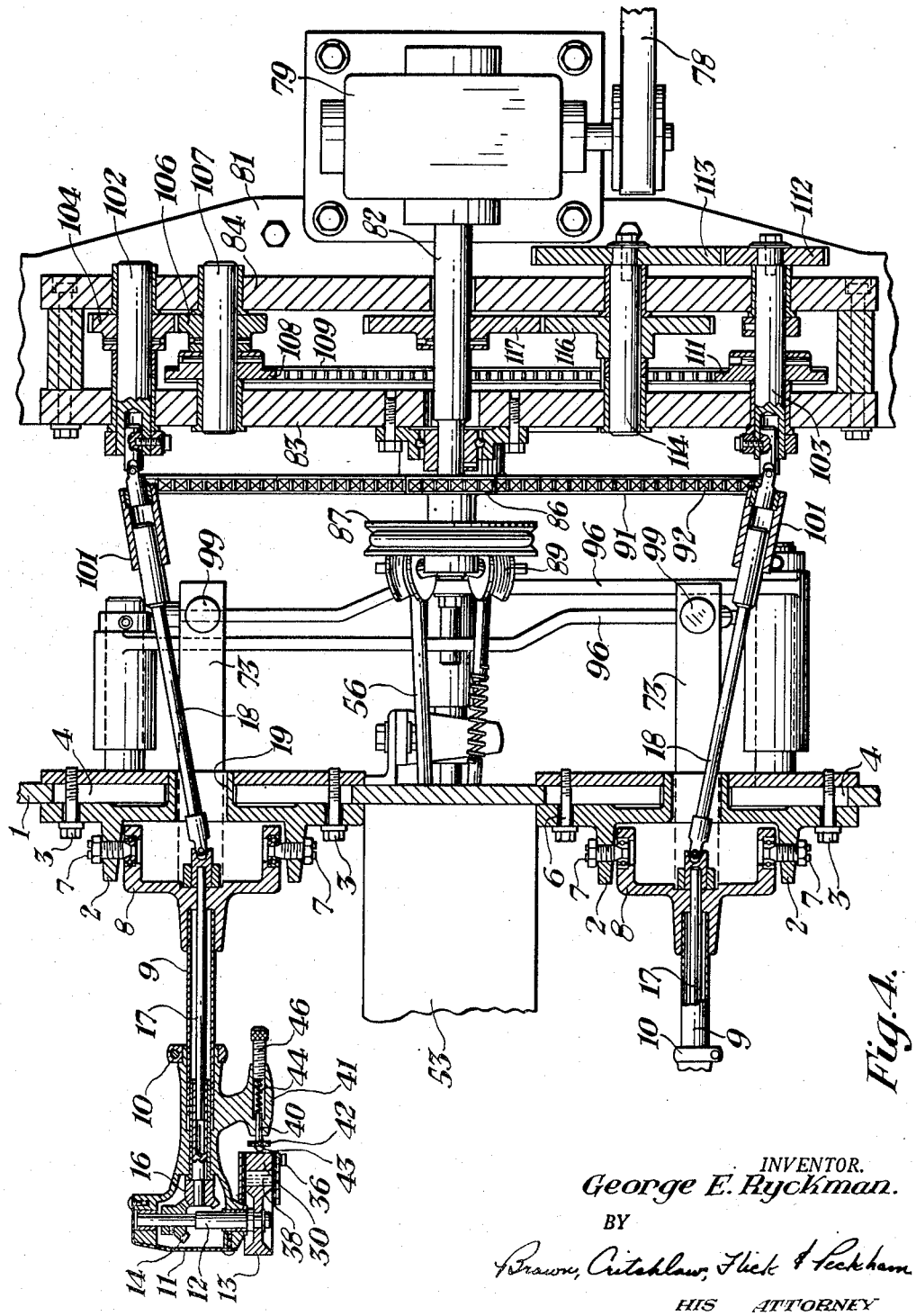
Figure 5:
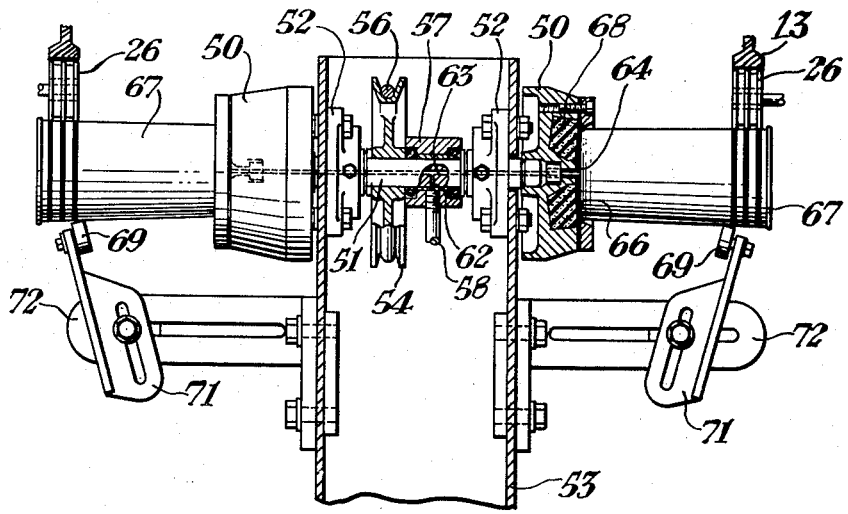
Figure 6:
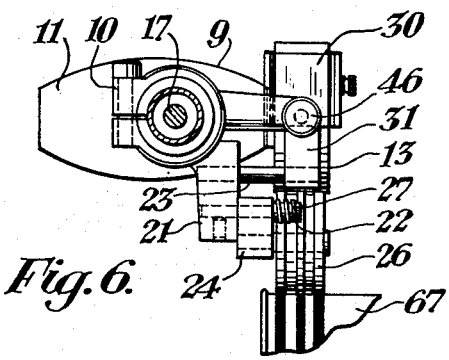
Figure 9:
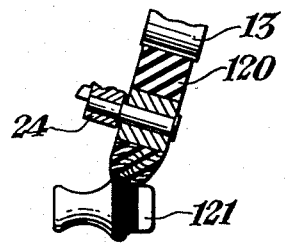
Figures 7, 8:
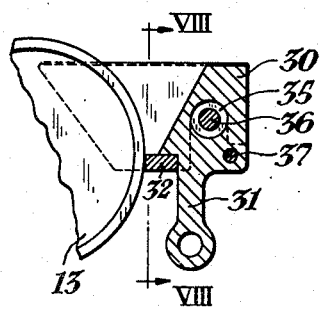
Figure 10:
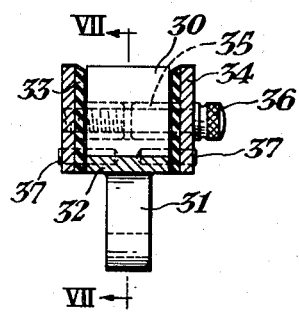

The invention is illustrated in the accompanying drawings, in which Fig. 1 is a side view of the machine, with part of the side wall broken away; Fig. 2 is a front view; Fig. 3 is an enlarged fragmentary vertical section taken approximately on the line III—III of Fig. 2; Fig. 4 is a fragmentary horizontal section taken on the line IV—IV of Fig. 3; Fig. 5 is an enlarged fragmentary vertical section taken approximately on the line V—V of Fig. 1, but showing the applicators engaging tumblers supported by the chucks; Fig. 6 is an enlarged vertical section of an applicator taken on the line VI—VI of Fig. 1; Fig. 7 is an enlarged central vertical section through one of the reservoirs; Fig. 8 is a vertical section taken on the line VIII—VIII of Fig. 7; Fig. 9 is a section through a modified applicator roller engaging an irregular article; and Fig. 10 is a similar view of the roller in its undeformed state.

Referring to the drawings, mounted on the front wall of a box-like housing 1 near its top are two laterally spaced brackets 2. Each bracket is held in place by bolts 3 extending through its opposite ends and through a horizontal slot 4, in the housing wall. The slot is longer than the bracket so that the bracket can be adjusted horizontally. The bracket openings through which the bolts extend are arcuate slots 6 around the center point of the bracket so that the bracket can be tilted. The front of each bracket supports a pair of horizontally spaced pivots 7 that support a rocker member 8. The rocker has a tubular extension in front that supports the inner or rear end of a tubular arm 9, formed from telescoped portions that are adjustably clamped together at 10. The outer or front end of the arm is enlarged to form a hollow head 11. As shown in Fig. 4, inside this head a short shaft 12 extends transversely of the axis of the arm with its opposite ends journaled in the opposite sides of the head. One end of the shaft projects from the head and supports a cylindrical metal drum 13. Mounted on the shaft inside the head is a bevel gear 14 that meshes with another bevel gear 16 mounted on a shaft 17 that extends back through the hollow arm and into the rocker. The rear end of this shaft is connected by a universal joint to the front end of another shaft 18 that extends back through a slot 19 in the bracket 2 and into housing 1, where it is driven in a manner that will be described later.

Each hollow arm 9 has near its front end a depending lug 21, from one side of which two vertically spaced pins 22 and 23 project, as shown in Figs. 3 and 6. Pivotally mounted on the lower pin 22 is a short arm 24 that extends forward and supports a roller 26 beneath the metal drum 13. Roller 26 has a body of resilient material, such as rubber or the like. This resilient roller is pressed up against the drum by the short arm 24, which is urged upward by means of a torsion spring 27 connected to it and to lower pin 22.

In order to apply a precious metal solution to rollers 26 for application to rotating articles, a reservoir for the solution is mounted at one side of the axis of each metal drum. Each reservoir is provided with a well having an open side that receives a portion of the periphery of the adjacent drum. Preferably, the reservoir has a body 30 provided with a depending extension 31 pivotally mounted on the upper pin 23. The side of the body that is nearest to the drum is inclined upward away from it, and the lower end of that side is spaced from the drum by a doctor blade 32 that is welded to the lower end of the body and extends forward from it to the drum, as shown in Fig. 7. Only the upper edge of the blade should be next to the drum. A pair of parallel resilient gasket plates 33 (Fig. 8) are disposed on opposite sides of the reservoir body and extend forward from it to engage and straddle a portion of the metal drum. The outer surfaces of these plates are engaged by a pair of metal plates 34 that are provided with tubular bosses 35 which project into a passage through the reservoir body. A thumb screw 36 extends slidably through one of the bosses and is threaded in the other one so that the gasket plates can be pressed against the body and the edges of the drum to form a well between the drum and reservoir body. Dowel pins 37 prevent the plates from pivoting around the screw. It is this well that contains the precious metal solution 38 (Fig. 4) which is applied to the metal drum as the drum is rotated in a direction that will move its periphery downward through the well.

The distance that doctor blade 32 can move away from the metal drum determines the thickness of the layer or film of solution that is carried down out of the reservoir by the drum. To control the thickness of this film on the drum and to insure that it will have uniform thickness throughout its width, a pin 40 is slidably and rotatably mounted in a tubular member 41 that is supported by one side of the hollow arm behind the reservoir, as shown in Fig. 4. The passage through this member is parallel to the arm. The projecting front end of the pin is provided with an enlarged knurled portion 42 having a pointed projection 43 offset relative to the axis of the pin for engaging the back of the reservoir. Inside tubular member 41 there is a spring 44 that is compressed between the rear end of the pin and the front end of a screw 46 threaded in the rear end of the tubular member. By adjusting this screw the pressure of the pin projecting against the reservoir can be controlled to control the thickness of the metal solution on the metal drum. By rotating knurled portion 42 of the pin, its projection 43 can be swung to one side or the other of the central vertical plane of the reservoir to exert pressure at that particular point when necessary, in order to space doctor blade 32 a uniform distance from the drum.

From the foregoing it will be seen that the driven metal drums will drive the resilient rollers frictionally engaging them and that the drums will continuously receive very thin, controlled layers of metal solution from the reservoirs and apply them to the peripheries of the resilient rollers for application to articles below them, such as glass tumblers. For holding such articles in position to be decorated, as shown in Fig. 5, a pair of chucks 50 are mounted on the opposite ends of a horizontal shaft 51 journaled in bearings 52 fastened to the opposite sides of a vertically adjustable casing 53 which is mounted on the front wall of housing 1. Mounted on the shaft between the bearings is a pulley 54 that is driven by a belt 56 which extends back through an opening in the housing. Encircling shaft 51 at one side of the pulley is a sealed sleeve 57 connected through a pipe 58 with a vacuum pump 59 (Fig. 1) inside housing 1. A three-way valve 60 in pipe 58 is controlled by a rotating cam 61. The sleeve 57, through a radial passage 62 in the shaft, is in communication with an axial passage 63 extending from end to end of the shaft. The opposite ends of this passage communicate with the inner ends of hollow screws 64 that fasten the centers of flexible diaphragms 66 to the centers of the two chucks and normally hold the diaphragms concave. Thus, when the bottom of a tumbler 67 is placed against a diaphragm, a small chamber is formed between them, from which air is withdrawn by the vacuum pump so as to draw the tumbler inward and hold it in the chuck. The diaphragm is backed up by a resilient cushion 68 that is compressed as the tumbler is drawn inward. The vacuum holds the tumbler in the chuck, but to keep the pressure of the applicator from tipping the tumbler out of the chuck, the tumbler is supported from below by a pair of rollers 69 mounted on an upright slotted bracket 71 adjustably connected to a rigid slotted bracket 72 projecting from the adjacent side of casing 53.

In order to swing the hollow arms 9 down and up so that the applicator rollers will be lowered against tumblers rotated by the chucks and then lifted away from them, a bar 73 is connected to each rocker 8 and extends back through a wide slot 74 in the front of housing 1. The driving mechanism for swinging the rear ends of bars 73 vertically, for driving the metal drums, and for driving the chucks, now will be described.

An electric motor 76 is mounted on the back of a vertical column 77 in housing 1, and through a belt 78 it drives a gear reduction unit 79 mounted on a horizontal plate 81. The motor also drives vacuum pump 59. The output shaft 82 of the reduction unit extends forward through a pair of spaced vertical plates 83 and 84 mounted on the horizontal plate and extending across the housing. This shaft has a sprocket 86 and a pulley 87 mounted on its front end. Below the pulley the front plate 83 supports a bracket 88, on the front end of which a pair of downwardly converging pulleys 89 are mounted. The belt 56 from the chuck pulley 54 extends up around these inclined pulleys and over the top of the drive pulley 87 so that the chucks 50 are rotated continuously. The sprocket 86 is connected by a chain 91 to a large sprocket 92 rigidly mounted on a shaft 93 that is journaled in bearings 94 connected to column 77 and to the front of the housing. The shaft drives cam 61 for the vacuum valve. The shaft also carries cams 95, across the top of which extend substantially horizontal levers 96. One end of one lever is pivotally connected to the front wall of the housing at one side of the cams, and the other end of the other lever is mounted in a similar manner at the other side of the cams. The central portions of the two levers carry cam-follower rollers 97 that ride on top of the cams. The free end of each lever pivotally supports the lower end of a vertically adjustable link 98 which extends up through an opening in the rear end of the overlying bar 73. The upper end of the link has a head 99 that engages the upper surface of the bar. Consequently, as the levers are raised and lowered by the cams the links move up and down. When the links move downward, they swing bars 73 down and thereby swing the applicator rollers 26 upward. When the links rise, the applicator rollers swing downward by gravity and into contact with the tumblers. The shape of the cams 95 determines how many revolutions the tumblers will make while the rollers are in engagement with them.

As shown in Fig. 4, the rear ends of drive shafts 18 for drums 13 are splined in the front ends of short hollow shafts 101 connected by universal joints to the front ends of stub shafts 102 and 103 rotatably mounted in the opposite ends of the two vertical plates 83 and 84. Shaft 102 is driven by a gear 104 meshing with a gear 106 on a parallel shaft 107. Shaft 107 also carries a sprocket 108 that is driven by a chain 109 from a sprocket 111 mounted on shaft 103. The rear end of the latter shaft projects from plate 84 and carries a gear 112 meshing with a gear 113 on the rear end of a parallel shaft 114. Mounted on shaft 114 between the vertical plates is a gear 116 meshing with a driving gear 117 on the main drive shaft 82. The speed at which the metal rollers of the applicators are driven can be changed by removing gears 112 and 113 from their supporting shafts and substituting a pair of gears having a different ratio.

In the operation of this machine an operator places two tumblers in the continuously rotating chucks at the same time. Air is then exhausted from between the feet of the tumblers and the chucks to hold the tumblers in place with their outer portions supported on rollers 69. The two applicator heads now swing downward until the resilient rollers engage the outer surfaces of the rotating tumblers with the desired pressure. The peripheral speed of the rollers is the same as that of the tumblers and the precious metal solution on the rollers is applied to the tumblers. After the tumblers have made the desired number of revolutions against the rollers, the applicators are swung upward again and atmospheric pressure is restored to the chucks to release the tumblers. The operator simultaneously removes both pieces and then places two new tumblers in the chucks.

The operation of the machine requires no particular skill. It operates at high speed and produces uniformly high quality work. There is no waste of the precious metal solution, and no brushes or cloths to bother with. The applicators can be stored over night in a chest without having to be cleaned. The machine is adjustable for a wide range of items, including various shapes such as barrel, hourglass, flared and stemware. All the operator has to do is to insert and remove the ware and occasionally refill the reservoirs.

The applicator rollers 26 are provided with a plurality of radial projections for receiving metal solution from drums 13 and applying it to the tumblers. The projections may be arranged irregularly as in an embossed design which the rollers print in a band around the tumblers, or the projections may be annular ribs that apply continuous bands to the ware. In the latter case, the ribs on each roller are formed by providing it with one or more peripheral grooves 115, depending on whether two or more bands are to be applied simultaneously by the same roller. The general contour of the roller can be cylindrical or frusto-conical, depending on the degree to which the tumblers are tapered.

With the applicator disclosed herein a high viscosity medium of high gold content can be used, because the amount applied to the drums is controlled by the doctor blades. Due to the high film strength of such a medium, the bands applied to the tumblers are of uniform thickness across their widths. The high gold content of the solution permits the use of a very small reservoir, since only a very thin film need be applied to secure adequate gold coverage. In order to overcome the drag of the highly viscous solution and the doctor blades on the drums, it is necessary to drive them.

In Figs. 9 and 10, there is shown an applicator roller 120 which is designed to apply precious metal bands around irregular objects, such as ceramic insulators and the like. The resilient roller is ground to a shape (Fig. 10) that will permit it to conform to the different annular areas of the insulator 121 which are disposed at an angle to each other and which it has to engage simultaneously. The shape also is such that the metal drum 13 will flatten out the applying surface, as shown in Fig. 9, when the resilient roller is pressed against the work, so that the full width of the resilient roller periphery will receive precious metal solution from the drum. The angle of approach of the applicator rollers to the work is adjusted by tilting bracket 2 to provide the least slippage between the rollers and work.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An applicator for applying a band of precious metal solution simultaneously to different annular areas of a rotating article disposed at an angle to each other, comprising a support, a substantially cylindrical drum rotatably mounted on said support, means for applying said solution to the periphery of the drum, a resilient roller rotatably mounted on said support having its periphery divided into different annular areas disposed at an angle to each other for engagement with said areas of said article, and means carried by said support for pressing the roller against the drum tightly enough to flatten the periphery of the roller against the drum so that substantially the full width of the roller periphery will receive precious metal solution from the drum for application to said article.

2. An applicator for simultaneously applying a plurality of bands of precious metal solution to a rotating article, comprising a drum, means for driving the drum, a reservoir at one side of the drum having an open side receiving a portion of the drum, said portion of the drum forming a wall for said open side of the reservoir, the lower part of the reservoir being disposed close to the periphery of the drum for applying a thin layer of said solution thereto, and a resilient roller engaging the periphery of the drum to receive precious metal solution therefrom for application to said article, the roller being provided with at least one peripheral groove dividing its surface into a plurality of annular ribs.

3. An applicator for simultaneously applying a plurality of bands of precious metal solution to a rotating article, comprising a drum, a reservoir disposed at one side of the axis of the drum and provided with a well having an open side receiving a portion of the periphery of the drum, a doctor blade extending across the bottom of the well close to the drum, means pivotally supporting the reservoir on an axis parallel to the drum axis, adjustable means for pressing the reservoir and doctor blade toward the drum to control the thickness of the layer of said solution applied thereto, and a resilient roller engaging the periphery of the drum to receive precious metal solution therefrom for application to said article, the resilient roller being provided with at least one peripheral groove dividing its surface into a plurality of annular ribs.

4. An applicator for simultaneously applying a plurality of bands of precious metal solution to a rotating glass tumbler, comprising a drum, a reservoir disposed at one side of the axis of the drum and provided with a well having an open side receiving a portion of the periphery of the drum, a doctor blade extending across the bottom of the well close to the drum, means pivotally supporting the reservoir on an axis parallel to the drum axis, a tubular member mounted behind the reservoir, a pin slidably and rotatably mounted in said member and having a pointed projecting portion engaging the back of the reservoir, said projecting portion being offset relative to the axis of the pin, means for manually turning the pin in said member, means for pressing the pin against the reservoir to press the reservoir toward the drum, and a resilient roller engaging the periphery of the drum to receive precious metal solution therefrom for application to a tumbler, the resilient roller being provided with at least one peripheral groove dividing its surface into a plurality of annular ribs.

5. An applicator for simultaneously applying a plurality of bands of precious metal solution to a rotating glass tumbler, comprising a hollow head, a drive shaft journaled in the head and projecting therefrom, a drum mounted on an end of the shaft, a reservoir pivotally supported by the head at one side of the drum and having a lateral opening for applying said solution to the periphery of the drum, a doctor blade extending across the reservoir close to the drum, the blade being below said reservoir opening, adjustable means supported by the head behind the reservoir for pressing it toward the drum to control the thickness of the layer of said solution applied to the drum, a resilient roller engaging the periphery of the drum to receive precious metal solution therefrom for application to a tumbler, an arm pivotally supported by the head for supporting the roller, and a spring urging the arm toward the drum, the resilient roller being provided with at least one peripheral groove dividing its surface into a plurality of annular ribs.

6. A machine for applying a band of precious metal solution to a rotating article, comprising an arm, means pivotally supporting the arm on a transverse axis, a drum carried by the outer end of the arm, means carried by the arm for applying precious metal solution to the periphery of the drum, a resilient roller in engagement with the periphery of the drum to receive said solution therefrom for application to said article, means rotatably connecting the roller to the arm, a rotatable chuck spaced from one end of the roller in position to hold the side of said article beside the periphery of the roller, means connected with said arm for swinging it on said axis to move the roller radially toward and away from the axis of rotation of an article on said chuck, and means for adjusting the relationship between said two axes to change the angle of approach of the roller relative to said article.

7. A machine for applying a band of precious metal solution to a rotating article comprising a support, a bracket disposed against the support, an arm projecting from the bracket, means pivotally connecting the inner end of the arm to the bracket on an axis transverse to the arm, a drum carried by the outer end of the arm, means carried by the arm for applying precious metal solution to the periphery of the drum, a resilient roller in engagement with the periphery of the drum to receive said solution therefrom for application to said article, means rotatably connecting the roller to the arm, a rotatable chuck spaced from one end of the roller in position to hold the side of said article beside the periphery of the roller, means connected with said arm for swinging it on said axis to move the roller radially into and out of engagement with an article on said chuck, and means adjustably fastening said bracket to said support whereby to allow the bracket to be turned on the support to change the angle of approach of the roller to said article.

8. A machine for applying a band of precious metal solution to a rotating article, comprising a support, a bracket disposed against the support, and provided at its opposite ends with openings, bolts extending through said openings for fastening the bracket to the support, at least one of said openings being a slot extending transversely of the bracket to permit the bracket to be turned on the support, an arm projecting from the bracket, means pivotally connecting the inner end of the arm to the bracket on an axis transverse to the arm, a drum carried by the outer end of the arm, means carried by the arm for applying precious metal solution to the periphery of the drum, a resilient roller in engagement with the periphery of the drum to receive said solution therefrom for application to said article, a rotatable chuck spaced from one end of the roller in position to hold the side of said article beside the periphery of the roller, and means connected with said arm for swinging it on said axis to move the roller radially into and out of engagement with an article on said chuck.

9. A machine for applying a band of precious metal solution simultaneously to different annular areas of a rotating article disposed at an angle to each other, comprising an arm, means pivotally supporting the arm on a transverse axis, a substantially cylindrical hard drum with a rigid peripheral surface carried by the outer end of the arm, means carried by the arm for applying precious metal solution to the periphery of the drum, a resilient roller adapted to engage said portions of said article and having its periphery divided into different annular areas disposed at an angle to each other, means rotatably connecting the roller to the arm, a rotatable chuck spaced from one end of the roller in position to hold the side of said article beside the periphery of the roller, means connected with said arm for swinging it on said axis to move the roller radially into and out of engagement with an article on said chuck, the drum being movable toward the axis of the roller when the latter engages a rotating article, whereby to flatten the periphery of the roller against the drum so that substantially the full width of said periphery will receive precious metal solution from the drum for application to said article, and means for tilting said arm-supporting means in the plane of said axis to change the angle of approach of the roller to said article.

10. A tumbler banding machine comprising a hollow arm pivotally mounted on a transverse axis, a drum carried by the outer end of the arm, rotatable means extending through the arm for driving the drum, means carried by the arm for applying precious metal solution to the periphery of the drum, a resilient roller in engagement with the periphery of the drum to receive precious metal solution therefrom for application to a tumbler, means rotatably connecting the roller to the arm, a support disposed adjacent said arm, a chuck rotatably mounted on a horizontal axis on said support for holding a tumbler below the roller, driving means operatively connected to the chuck and to said rotatable means for rotating them, and means connected with said arm and operatively connected with the driving means for causing tilting of the arm to move the resilient roller down into and up out of engagement with a tumbler held by said chuck.

GEORGE E. RYCKMAN.

References Cited in the file of this patent

UNITED STATES PATENTS

| Number | Name | Date |
|---|---|---|
| 290,329 | Hoffmann | Dec. 18, 1883 |
| 1,718,047 | Hunker | June 18, 1929 |
| 1,985,800 | Schutz | Dec. 25, 1934 |
| 2,062,425 | Peters | Dec. 1, 1936 |
| 2,071,345 | Johnson et al. | Feb. 23, 1937 |
| 2,074,432 | Rollings | Mar. 23, 1937 |
| 2,314,474 | Bauman | Mar. 23, 1943 |
| 2,347,445 | Von Hofe | Apr. 25, 1944 |